UNITED STATES PATENT OFFICE.

ROBERT E. SCHMIDT, OF ELBERFELD, AND ADOLF SERTORIUS, OF FLITTARD, GERMANY, ASSIGNORS TO FARBENFABRIKEN OF ELBERFELD CO., OF NEW YORK, N. Y., A CORPORATION OF NEW YORK.

BLUE ANTHRAQUINONE DYE AND PROCESS OF MAKING SAME.

SPECIFICATION forming part of Letters Patent No. 687,658, dated November 26, 1901.

Application filed April 29, 1901. Serial No. 58,060. (No specimens.)

*To all whom it may concern:*

Be it known that we, ROBERT E. SCHMIDT, residing at Elberfeld, and ADOLF SERTORIUS, residing at Flittard, near Cologne, Germany, both doctors of philosophy and chemists, (assignors to the FARBENFABRIKEN OF ELBERFELD CO., of New York,) have invented a new and useful Improvement in Blue Anthraquinone Dyes and Processes of Making Same; and we hereby declare the following to be a clear and exact description of our invention.

Our invention relates to the manufacture of new blue coloring-matters of the anthracene series by causing sulfonating agents to act on anthraquinone derivatives having the following general formula:

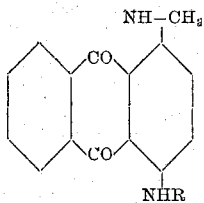

(R meaning in this formula an alphyl radical, such as phenyl, orthotolyl, paratolyl, xylyl, or the like.) The said anthraquinone derivatives, which we name "1-methylamido-4-alphylamidoanthraquinones," can be obtained by means of several methods—for instance, by condensing 1-4-methylamidochloroanthraquinone having the formula:

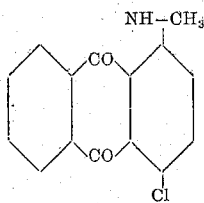

or 1-4-methylamidobromoanthraquinone of the formula:

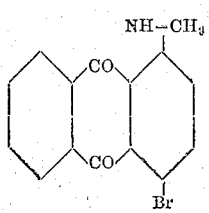

or 1-4-methylamidonitroanthraquinone of the formula:

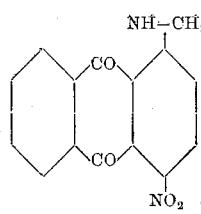

with primary aromatic amins, such as anilin orthotoluidin, paratoluidin, xylidin, or the like. The resulting condensation products represent dark-blue crystals insoluble in water, but readily soluble in chloroform and pyridin with a more or less greenish-blue color. By oxidation quinizarin is produced.

The new dyestuff sulfonic acids obtained from the above-mentioned condensation products by treating the latter with concentrated sulfuric acid, sulfuric monohydrate, or weakly-fuming sulfuric acid are in a dry state dark-blue powders which are readily soluble in water with from a pure greenish-blue to pure blue color. On treating their hot acidulated watery solution with a suitable oxidizing agent quinizarin is obtained. They dye unmordanted wool from acid-bath from pure greenish-blue to pure blue level shades, which are distinguished by their fastness to light.

In order to produce the said 1-methylamido-4-alphylamidoanthraquinones, we can proceed as follows, the parts being by weight: Ten parts of 1-4-methylamidonitroanthraquinone, which can be obtained, for instance, by nitrating alpha-methylamidoanthraquinone, are mixed with one hundred parts of paratoluidin. This resulting mixture is heated to about 180° centigrade until the greenish-blue color of the melt is changed no more on being further heated. After the reaction mass has cooled down to about 70° centigrade it is mixed with the equal volume of methylic alcohol, and then the resulting mixture is allowed to stand for about from twelve to twenty-four hours. During this time the condensation product separates in the shape of dark-violet-blue crystals. Subsequently it is filtered off and washed with a small quantity of cold methylic alcohol and dried. The resulting body having the formula:

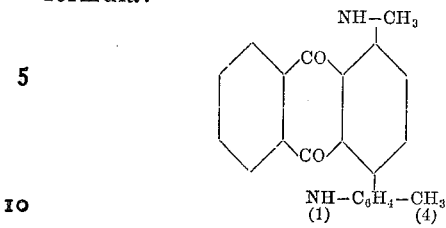

melts at about 192° centigrade. It is readily soluble in chloroform and pyridin with a pure greenish-blue color. The blue solution of the body in ethylic alcohol turns violet-red by the addition of concentrated hydrochloric acid.

In order to transform this condensation product into the new dyestuff sulfonic acid, ten parts of the finely-pulverized compound are dissolved in one hundred parts of sulfuric monohydrate. The resulting solution is then heated to about from 50° to 80° centigrade until a test portion is clearly dissolved by a large quantity of water. After cooling the reaction mass is poured into about from five hundred to one thousand parts of ice-water, by means of which operation the new dyestuff sulfonic acid which is difficultly soluble in dilute acids is precipitated. It is filtered off, mixed with ammonia or caustic-soda lye, dried, and pulverized.

When dry and pulverized, the new coloring-matter is a dark-blue powder which is scarcely soluble in chloroform and readily soluble in water with a greenish-blue color. By the addition of strong hydrochloric acid to its watery solution the color of the latter turns violet-red. By concentrated sulfuric acid (of 66° Baumé) it is dissolved, yielding a blue solution, the color of which changes into red on diluting it with water. On adding to its hot watery solution acidulated by means of sulfuric acid manganese dioxid ($MnO_2$) the color of the liquid turns green, and after some time brownish-red flakes of quinizarin are precipitated therefrom It dies unmordanted wool greenish-blue level shades which are distinguished by their fastness to light.

Having now described our invention and in what manner the same is to be performed, what we claim as new, and desire to secure by Letters Patent, is—

1. The process for producing new anthraquinone dyestuffs, which process consists in first treating 1-methylamido-4-alphylamido-anthraquinones having the following general formula:

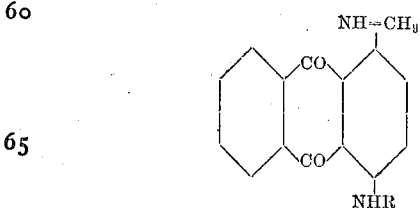

in which formula R means an alphyl radical, with sulfonating agents and then isolating the resulting dyestuff sulfonic acids from the reaction mixture, substantially as hereinbefore described.

2. The process for producing a new anthraquinone dyestuff, which process consists in first treating 1-methylamido-4-paratolylamidoanthraquinone having the formula:

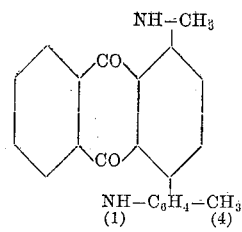

with sulfonating agents, and then isolating the resulting dyestuff sulfonic acid from the reaction mixture, substantially as hereinbefore described.

3. The herein-described new dyestuff sulfonic acids, obtainable by sulfonating 1-methylamido-4-alphylamidoanthraquinone which dyestuffs in the shape of their alkaline salts are dark-blue powders soluble in water with from a pure greenish-blue to pure blue color, quinizarin being obtained by treating their hot acidulated watery solution with a suitable oxidizing agent; dyeing unmordanted wool from acid bath from pure greenish-blue to pure blue level shades, which are distinguished by their fastness to light, substantially as hereinbefore described.

4. The herein-described new dyestuff sulfonic acid, obtainable by sulfonating 1-methylamido-4-paratolylamidoanthraquinone which dyestuff is in the shape of its alkaline salts, a dark-blue powder being but scarcely soluble in chloroform and readily soluble in water, with a greenish-blue color which is changed into violet-red by the addition of strong hydrochloric acid, being dissolved by concentrated sulfuric acid of 66° Baumé to a blue solution the color of which changes into red on being diluted with water; dyeing unmordanted wool greenish-blue level shades which are distinguished by their fastness to light, substantially as hereinbefore described.

In testimony whereof we have signed our names in the presence of two subscribing witnesses.

ROBERT E. SCHMIDT.
ADOLF SERTORIUS.

Witnesses:
OTTO KÖNIG,
J. A. RITTERSHAUS.

It is hereby certified that in Letters Patent No. 687,658, granted November 26, 1901, upon the application of Robert E. Schmidt, of Elberfeld, and Adolf Sertorius, of Flittard, Germany, for an improvement in "Blue Anthraquinone Dyes and Processes of Making Same," errors appear in the printed specification requiring correction, as follows:

On page 1, the formula, lines 17 to 24,

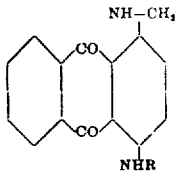 should read 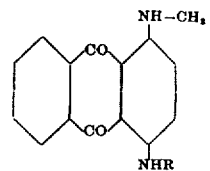

Same page, lines 33 to 40,

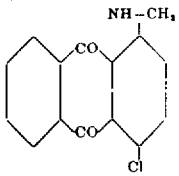 should read 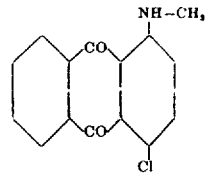

Same page, lines 45 to 50,

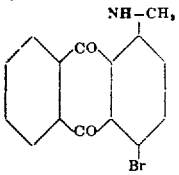 should read 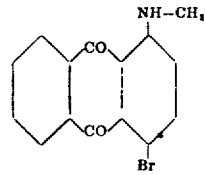

Same page, lines 55 to 62,

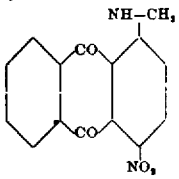 should read 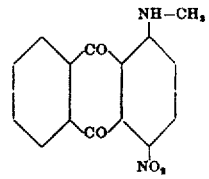

Page 2, lines 3 to 10,

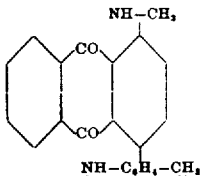 should read 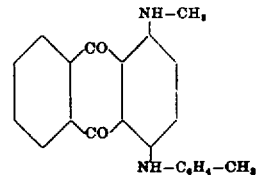

Same page, lines 60 to 67,

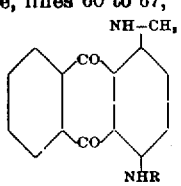 should read 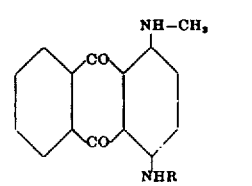

Same page, lines 79 to 86,

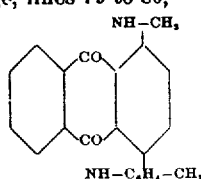 should read 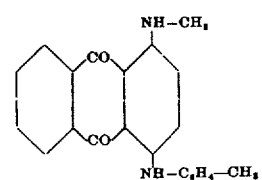

and that the said Letters Patent should be read with these corrections therein, that the same may conform to the record of the case in the Patent Office.

Signed, countersigned, and sealed this 4th day of February, A. D. 1902.

[SEAL.]
           F. L. CAMPBELL,
           *Assistant Secretary of the Interior.*

Countersigned:
    F. I. ALLEN,
      *Commissioner of Patents.*